(12) United States Patent
Chesbrough

(10) Patent No.: US 9,493,214 B2
(45) Date of Patent: Nov. 15, 2016

(54) CABLE SUPPORT SYSTEM

(71) Applicant: Dock Cable Float LLC, Gravois Mills, MO (US)

(72) Inventor: Thomas Robert Chesbrough, Gravois Mills, MO (US)

(73) Assignee: DOCK CABLE FLOAT LLC, Gravois Mills, MO (US)

( * ) Notice: Subject to any disclaimer, the term of this patent is extended or adjusted under 35 U.S.C. 154(b) by 0 days.

(21) Appl. No.: 14/851,147

(22) Filed: Sep. 11, 2015

(65) Prior Publication Data

US 2016/0075415 A1    Mar. 17, 2016

Related U.S. Application Data

(60) Provisional application No. 62/050,191, filed on Sep. 14, 2014.

(51) Int. Cl.
*B63B 3/06* (2006.01)
*B63B 22/02* (2006.01)

(52) U.S. Cl.
CPC *B63B 22/02* (2013.01); *B63B 3/06* (2013.01)

(58) Field of Classification Search
CPC .................. F41H 11/05; B63G 9/02
See application file for complete search history.

(56) References Cited

U.S. PATENT DOCUMENTS

| 2,117,008 | A | * | 5/1938 | Oswalt | E02F 7/10 14/22 |
|---|---|---|---|---|---|
| 3,655,905 | A | | 4/1972 | Ray | |
| 4,063,322 | A | * | 12/1977 | Tolan | B63B 21/04 114/267 |
| 4,237,642 | A | * | 12/1980 | Petorella | A01K 91/18 43/26.1 |
| 4,764,137 | A | | 8/1988 | Schulte | |
| 5,056,448 | A | * | 10/1991 | Miller, Sr. | B63B 7/04 114/357 |
| 5,738,313 | A | * | 4/1998 | Rinke | F16L 3/22 248/211 |
| 6,443,088 | B1 | * | 9/2002 | Putman | B63B 17/04 114/343 |
| 2004/0129846 | A1 | * | 7/2004 | Adams | F21V 21/088 248/231.81 |
| 2005/0103250 | A1 | | 5/2005 | Thomson | |
| 2012/0076590 | A1 | | 3/2012 | Bruder | |

FOREIGN PATENT DOCUMENTS

GB    2195306 A * 4/1988    ......... B63B 35/7973

* cited by examiner

*Primary Examiner* — Edwin Swinehart
(74) *Attorney, Agent, or Firm* — Armstrong Teasdale LLP

(57) ABSTRACT

A cable support system for supporting a cable over water includes a base constructed to float on the surface of the water. A cable support is connected to and disposed at least in part above the base. A coupling mechanism couples the cable to the support such that the cable is held by the support above the base.

20 Claims, 7 Drawing Sheets

CABLE SUPPORT SYSTEM

CROSS-REFERENCE TO RELATED APPLICATION

This nonprovisional application claims priority to U.S. Provisional Patent Application Ser. No. 62/050,191, filed on Sep. 14, 2014, which is incorporated in its entirety by reference.

FIELD

The field of the disclosure relates generally to cable support systems. More particularly, this disclosure relates to a cable support system that floats on water and supports a cable a distance above the water.

BACKGROUND

Sometimes cables are connected to and extend between floating structures, stationary structures, and/or land bodies. For example, the cables can extend across water and be secured to a floating structure, such as a dock, to anchor the floating structure to a stationary structure. The cables can be submerged at least partially in the water such that the water corrodes the cables. As a result, the cables can deteriorate and possibly fail. In addition, environmental conditions such as waves and wind can cause movement and failure of the cables. Moreover, the cables can present hazards to people in the water, to watercraft, and to wildlife.

Some cables are enclosed in apparatus to minimize cable corrosion. However, the apparatus may not be designed to float on water and support the cables a distance above the water. Moreover, the enclosed cables may be fixed in a stationary position such that movement of the apparatus would subject the cables to stresses that could cause failure of the cables.

Some cable systems may include floatation devices. For example, some floating cable barriers include a plurality of floats and an energy-dissipation system. However, these cable systems are expensive and complicated to install and maintain. Moreover, the floatation devices in the cable systems may not prevent the cables from being submerged in the water.

BRIEF DESCRIPTION

In one aspect, a cable support system for supporting a cable over water includes a base constructed to float on the surface of the water. A cable support is connected to and disposed at least in part above the base. A coupling mechanism couples the cable to the support such that the cable is held by the support above the base.

In another aspect, a kit for assembling a cable support system includes a front base portion and a rear base portion. The front base portion is configured to couple to the rear base portion to form a base that floats on the water. A support for supporting a cable is configured to couple to the base intermediate the front base portion and the rear base portion such that the support extends at least in part above the base.

In yet another aspect, a cable support system for supporting a cable includes an open frame. The open frame defines a plurality of openings for fluid to pass through. The open frame includes a base portion comprising two opposing ends. The base portion defines a length of the cable support system between the opposing ends. A support portion is carried by the base such that at least a portion of the support is disposed at a height above the base. A ratio of the length to the height is in a range of 1.5 to 5.

BRIEF DESCRIPTION OF THE DRAWINGS

Corresponding reference characters indicate corresponding parts throughout the several views of the drawings.

DETAILED DESCRIPTION OF THE DRAWINGS

Figure 1:
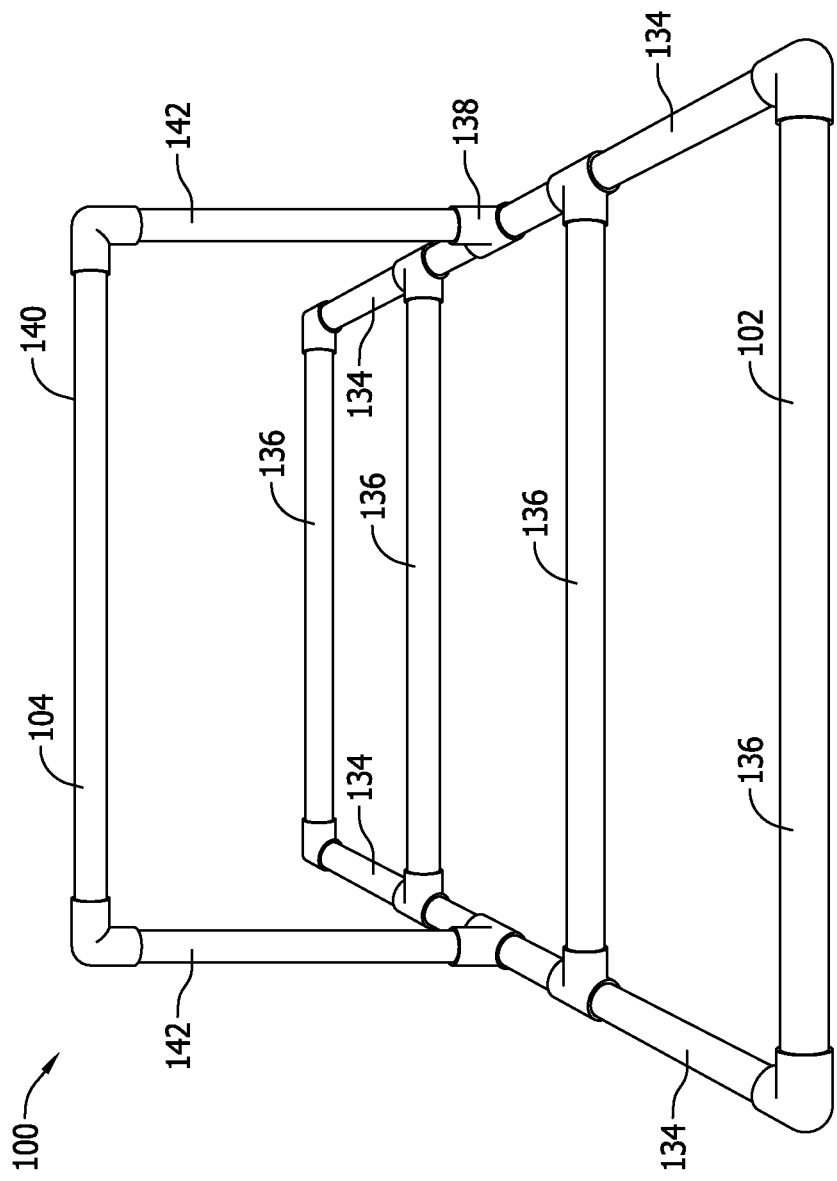
FIG. 1 is a perspective view of one embodiment of a cable support system.

The present invention is directed generally to a cable support system that floats on water and supports a cable a distance above a surface of the water. The cable support system is lightweight and allows the cable to have a range of motion to relieve stresses due to external forces. The cable support system is balanced such that the support system remains substantially upright and supports the cable at the desired distance above the water. In some embodiments, the cable support system includes an open frame to allow moving fluids, such as waves and wind, to pass through the cable support system. Embodiments of the cable support system reduce time and money spent manufacturing, handling, installing, and maintaining the cables and the cable support systems.

Referring now to the drawings and in particular to FIGS. 1-5, one embodiment of a cable support system is designated in its entirety by the reference number 100. The cable support system 100 includes a base 102 and a support 104. The support 104 extends from the base 102 and supports a cable 106 (shown in FIG. 5) a distance above the base. The base 102 is configured to float on a surface 202 of water 204 (shown in FIG. 6) such that the support 104 extends substantially perpendicularly to the surface of the water. In suitable embodiments, the support 104 and base 102 may have any configurations that enable the cable support system 100 to support the cable 106 a distance above the water 204. For example, in some suitable embodiments, the support 104 may be angled in relation to the base 102 at an angle other than 90°.

Figure 2:
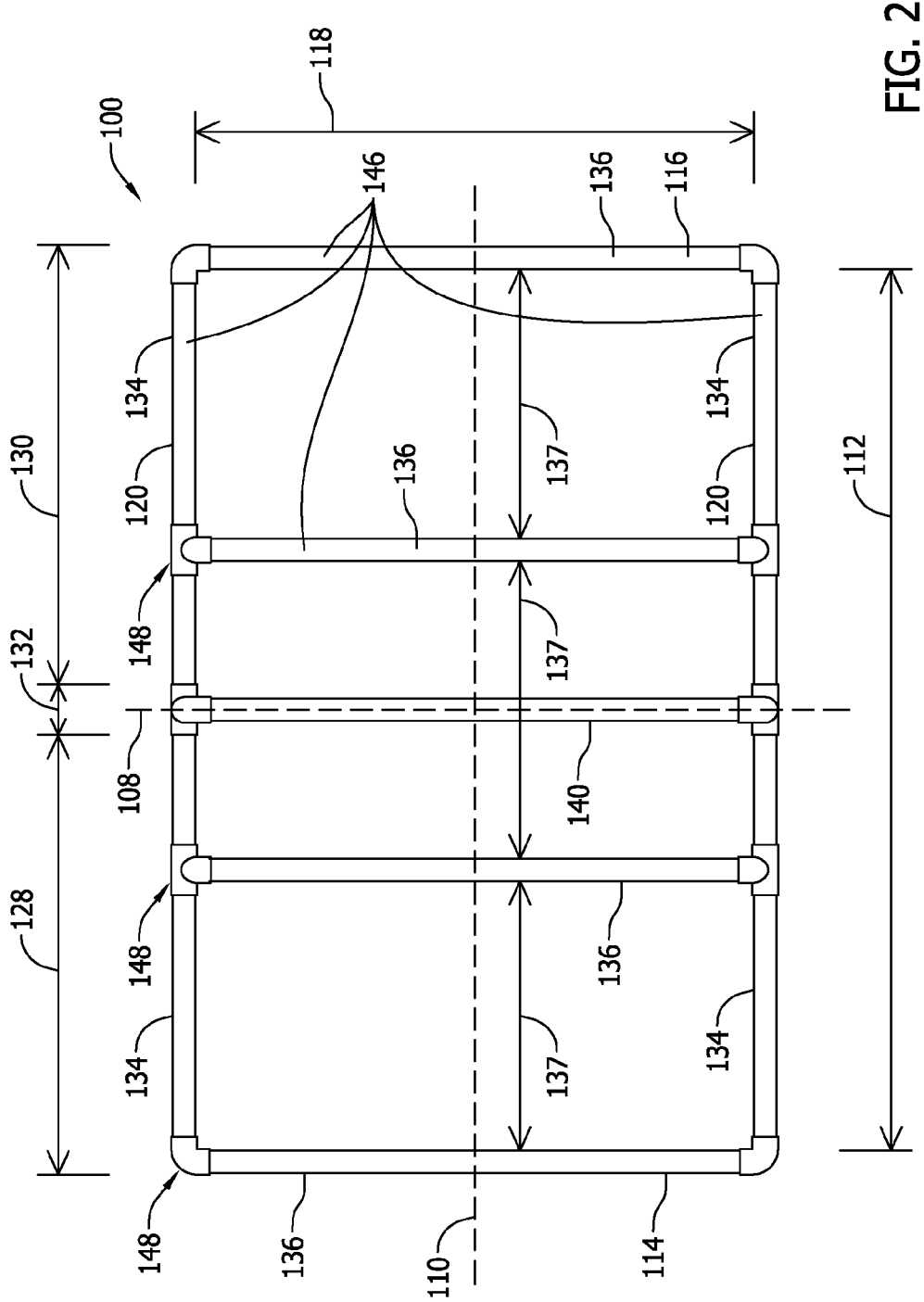
FIG. 2 is a top plan view of the cable support system shown in FIG. 1.

As shown in FIG. 2, the base 102 extends in a lateral direction 108 and a longitudinal direction 110. The base 102 has a length 112 defined in the longitudinal direction 110 between opposing ends 114, 116. In suitable embodiments, the length 112 may be any measurement that enables the cable support system 100 to function as described herein. For example, the length 112 may be in a range between about 36 inches and about 96 inches or in a range between about 60 inches and about 72 inches. In the illustrated embodiment, the length 112 is approximately 66 inches. A width 118 is defined in the lateral direction 108 between a pair of sides 120. In suitable embodiments, the width 118 may be any measurement that enables the cable support system 100 to function as described herein. For example, the width 118 may be in the range between about 12 inches and about 60 inches or in the range between about 24 inches and about 48 inches. In the illustrated embodiment, the width 118 is approximately 40 inches.

Figure 3:
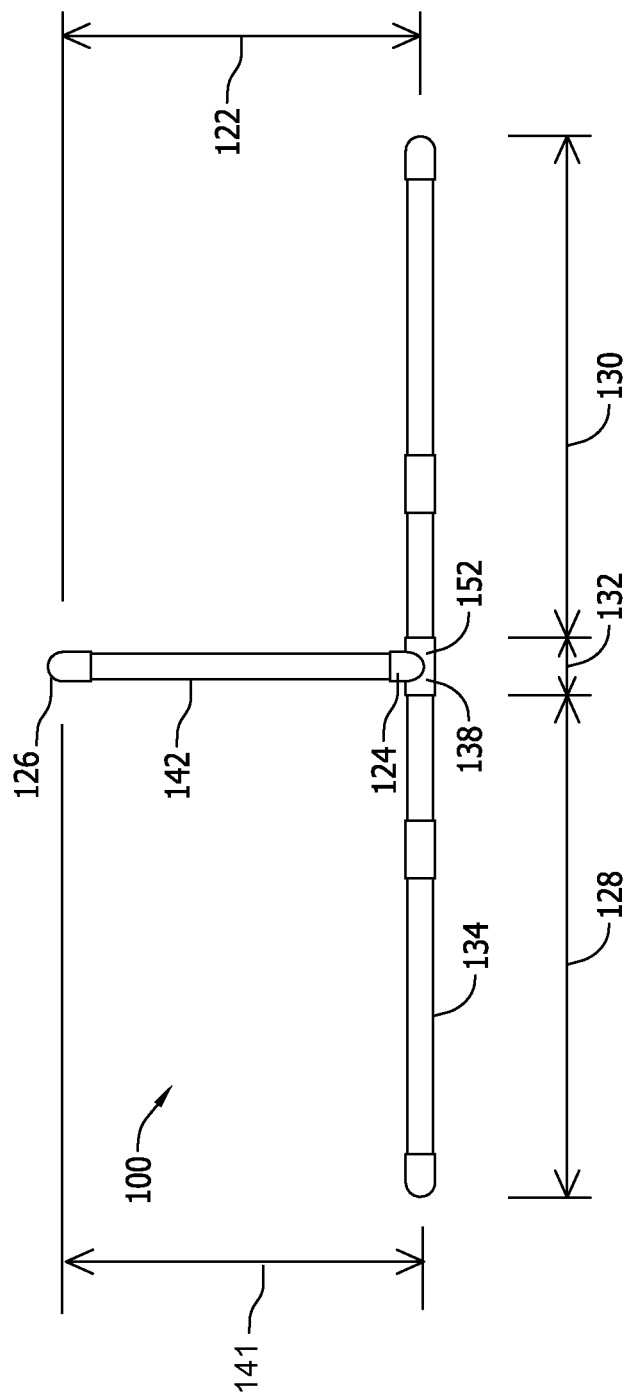
FIG. 3 is a side elevation of the cable support system shown in FIG. 1.
Figure 4:
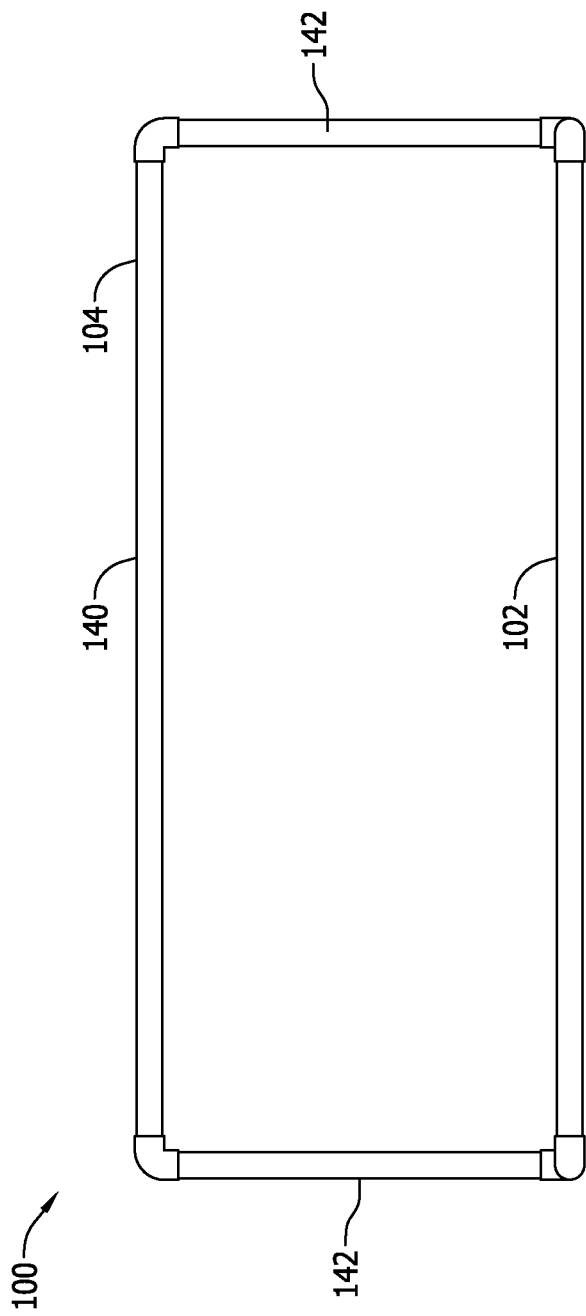
FIG. 4 is a front elevation of the cable support system shown in FIG. 1.

With reference to FIGS. 3 and 4, the support 104 has a height 122 defined between a proximal end 124 and a distal end 126. In the illustrated embodiment, a portion of the cable 106 extends along the support 104 such that the cable is supported at the height 122 above the water. In suitable embodiments, the height 122 may be any measurement that enables the cable support system 100 to support the cable 106. For example, the height 122 may be in the range of about 6 inches to about 36 inches or in the range of about 12 inches to about 24 inches. In the illustrated embodiment, the height 122 is approximately 22 inches.

In suitable embodiments, the length 112, width 118, and height 122 facilitate the cable support system 100 supporting the cable 106 above the water 204 as the cable support system floats on the water. In particular, a ratio of the length 112 to the height 122 facilitates the cable support system 100 remaining upright even as forces act on the support 104. The cable support system 100 may have any ratio of the length 112 to the height 122 that facilitates the cable support system 100 maintaining an upright position. For example, the ratio of the length 112 to the height 122 may be in a range of about 1.5 to about 5 or the ratio of the length 112 to the height 122 may be in in a range of about 2 to about 4.

As best seen in FIGS. 2 and 3, the base 102 includes a front portion 128, a rear portion 130, and a middle portion 132. In other embodiments, the base 102 may include any portions that enable the cable support system 100 to function as described herein. In the illustrated embodiment, the middle portion 132 is centered in relation to the longitudinal direction 110 of the base. In other embodiments, the middle portion may be off-center in relation to the longitudinal direction 110. In the illustrated embodiment, each of the front portion 128 and the rear portion 130 includes a pair of side members 134 and a pair of cross members 136 extending between the side members. The cross members 136 are spaced apart a distance 137. The distance 137 may be any measurement that enables the cable support system to function as described herein. For example, the distance 137 may be in the range of about 2 inches to about 36 inches or in the range of about 6 inches to about 18 inches. In the illustrated embodiment, some of the distances 137 between the cross members 136 vary from each other. In some suitable embodiments, all of the cross members 136 may be spaced apart equal distances 137. While in the illustrated embodiment the cross members 136 are substantially linear, any of the cross members 136 may be non-linear without departing from some aspects of this disclosure. For example, at least some of the cross members 136 may be angled and intersect to form x-shaped cross bracing.

In suitable embodiments, the support 104 may include any members that enable the support 104 to function as described. In the illustrated embodiment, the support 104 includes a joint portion 138 at its proximal end 124 and a support member 140 at its distal end 126. The support member 140 extends between and is supported by two support legs 142. In suitable embodiments, the support legs 142 may extend from any portion of the base 102. In the illustrated embodiment, the support legs 142 extend from the middle portion 132. The support member 140 is disposed at a support member height 141 above the base 102. In suitable embodiments, the support member height 141 may be any measurement that enables the cable support system 100 to support the cable 106 at the height 122. For example, the support member height 141 may be in the range of about 6 inches to about 36 inches or in the range of about 12 inches to about 24 inches. In the illustrated embodiment, the support member height 141 is approximately 22 inches. Accordingly, in the illustrated embodiment, the support member height 141 is approximately equal to the height 122. In other suitable embodiments, the support member height 141 and the height 122 may be different without departing from some aspects of this disclosure. For example, the support member 140 may be disposed at a position between the proximal end 124 and the distal end 126 such that the support member height 141 is less than the support height 122.

Figure 5:
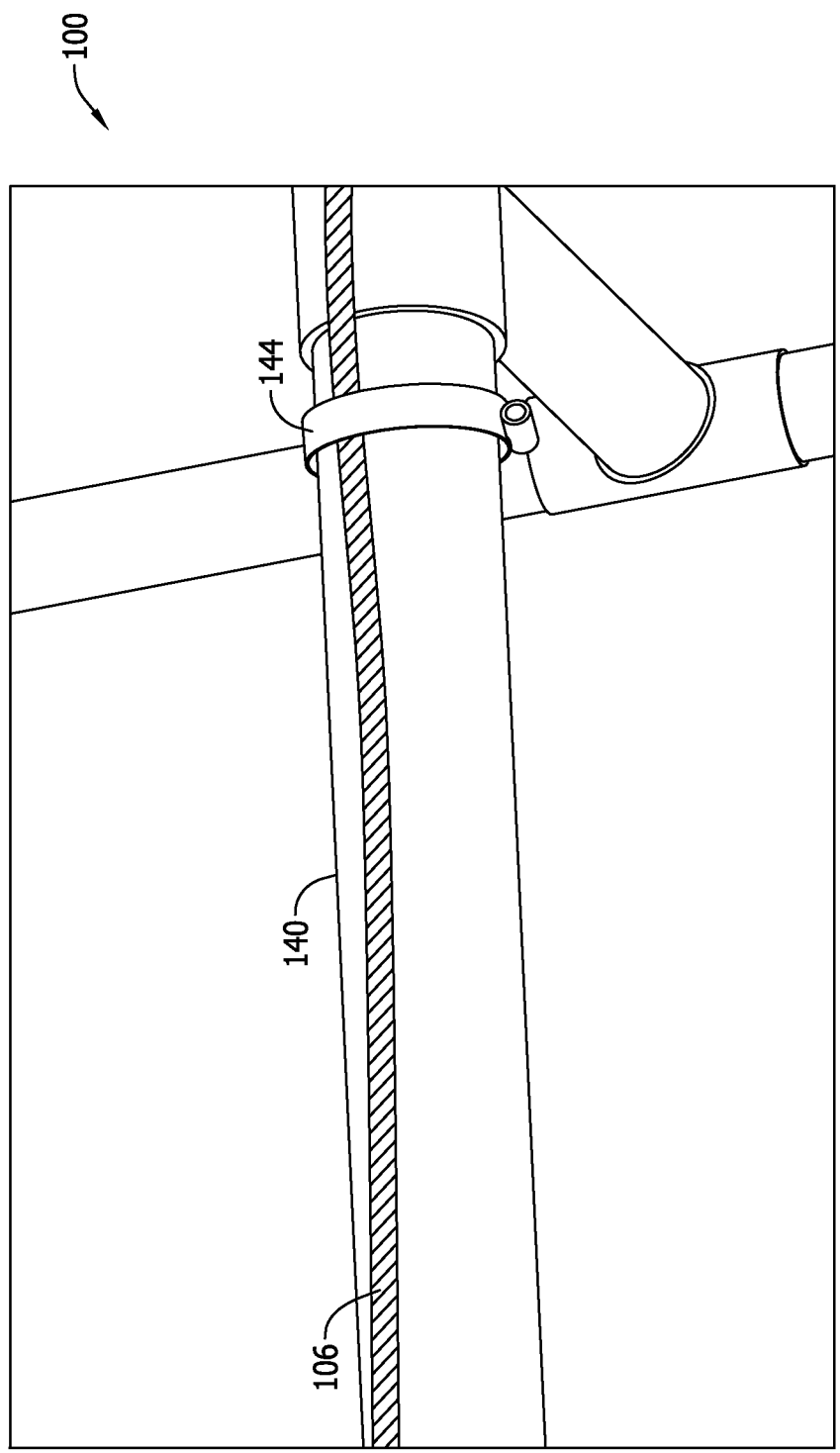
FIG. 5 is an enlarged perspective view of a portion of the cable support system shown in FIG. 1.

With reference to FIG. 5, a coupling mechanism 144 couples the cable 106 to the cable support system 100. In suitable embodiments, the coupling mechanism 144 couples the cable 106 to any portion of the cable support system 100. In the illustrated embodiment, the coupling mechanism 144 couples the cable 106 to the support member 140 such that the cable 106 extends along and is supported by the support member. In the illustrated embodiment, the coupling mechanism 144 comprises two clamps that clamp around the cable 106 and the support member 140. In other suitable embodiments, the coupling mechanism 144 may comprise any mechanism suitable to couple the cable 106 to the support member 140. For example, the coupling mechanism 144 may comprise, without limitation, mechanical fasteners, straps, adhesives, cords, wires, hooks, clips, screws, and combinations thereof. In some suitable embodiments, the coupling mechanism 144 may be integrated into a portion of the support 104. For example, the support 104 may include one or more openings or channels (not shown) configured to receive a portion of the cable 106.

In reference back to FIGS. 1-4, the cable support system 100 has an open frame construction which facilitates the cable support system being lightweight, simple to assemble, and inexpensive. In the illustrated embodiment, the cable support system 100 is constructed from a plurality of pipes 146. In suitable embodiments, the cable support system 100 may be constructed in any manner that enables the cable support system 100 to float on the water and support the cable 106. It is also understood that the cable support system 100 may be constructed from any suitable materials. For example, the cable support system 100 may be, without limitation, plastic, polyvinyl chloride, metal, wood, rubber, synthetic materials, and combinations thereof. In the exemplary embodiment, the pipes 146 are substantially hollow polyvinyl chloride pipes, which are lightweight, buoyant, and relatively inexpensive. In suitable embodiments, the pipes 146 may be made from and/or contain a material to increase the buoyancy of the cable support system 100. In further suitable embodiments, the pipes may be made from and/or contain a material that facilitates the cable support system 100 resisting external forces and maintaining an upright and substantially stationary position.

The base 102 and the support 104 each comprise a plurality of pipes 146 coupled at joints 148. The plurality of pipes 146 define a plurality of openings 150 for fluid to pass through the open frame. Suitably, the openings 150 cover a majority of the cable support system 100 such that waves and wind pass through the cable support system with minimal transfer of forces to the cable support system. In alternative embodiments, the cable support system 100 may include panels (not shown) at least partially covering the base 102 and support 104 without departing from some aspects of this disclosure. For example, the cable support system 100 may include a sign covering a portion of the cable support system.

In suitable embodiments, the cable support system 100 may be any color. In some embodiments, at least a portion of the cable support system 100 may be a color that facilitates the cable support system 100 contrasting with the surrounding environment to increase visibility. Additionally, the cable support system may be a color that is aesthetically pleasing to a consumer and/or is expressive for a consumer. For example, the cable support system 100 may be the colors of a favored athletic team and/or may be colors that match a company logo. Suitably, the color is included in the material of the cable support system 100 to inhibit the color from fading. Additives such as ultraviolet protection and color enhancements may be added to the material. Coatings and/or paints may be added to the surface of the materials to provide a desired finish in some suitable embodiments.

With reference back to FIGS. 1-5, the cable support system 100 may be packaged as a kit for distribution. For example, the kit may include a plurality of separate components that are assembled to form the cable support system 100 at a desired site. In one suitable embodiment, the kit includes the front portion 128, the rear portion 130, and the support 104, each of which is at least partially assembled. The kit may further include a t-shaped connection 152 (FIGS. 1 and 3) for connecting the front portion 128, the rear portion 130, and the support 104. In some embodiments, the t-shaped connection 152 is connected to one of the front portion 128, rear portion 130, and support 104. In other embodiments, the t-shaped connection 152 is included as a separate component for the end user to connect to the front portion 128, rear portion 130, and support 104. The t-shaped connector has two opposing ends 154 and a perpendicular end 156. The front portion 128 and the rear portion 130 connect to the opposed ends 154 and the support 104 connects to the perpendicular end 156. It is understood the kit may include any type of components, connections, and/or joints that facilitate the cable support system functioning as described herein. For example, the kit may include a plurality of the pipes 146 and a plurality of the joints 148 for connecting the pipes. In further embodiments, the components included in the kit may be directly connectable by inserting a portion of one component into a different component. Suitably, the kit may include the coupling mechanism 144 for coupling the cable 106 to the cable support system 100.

Figure 6:
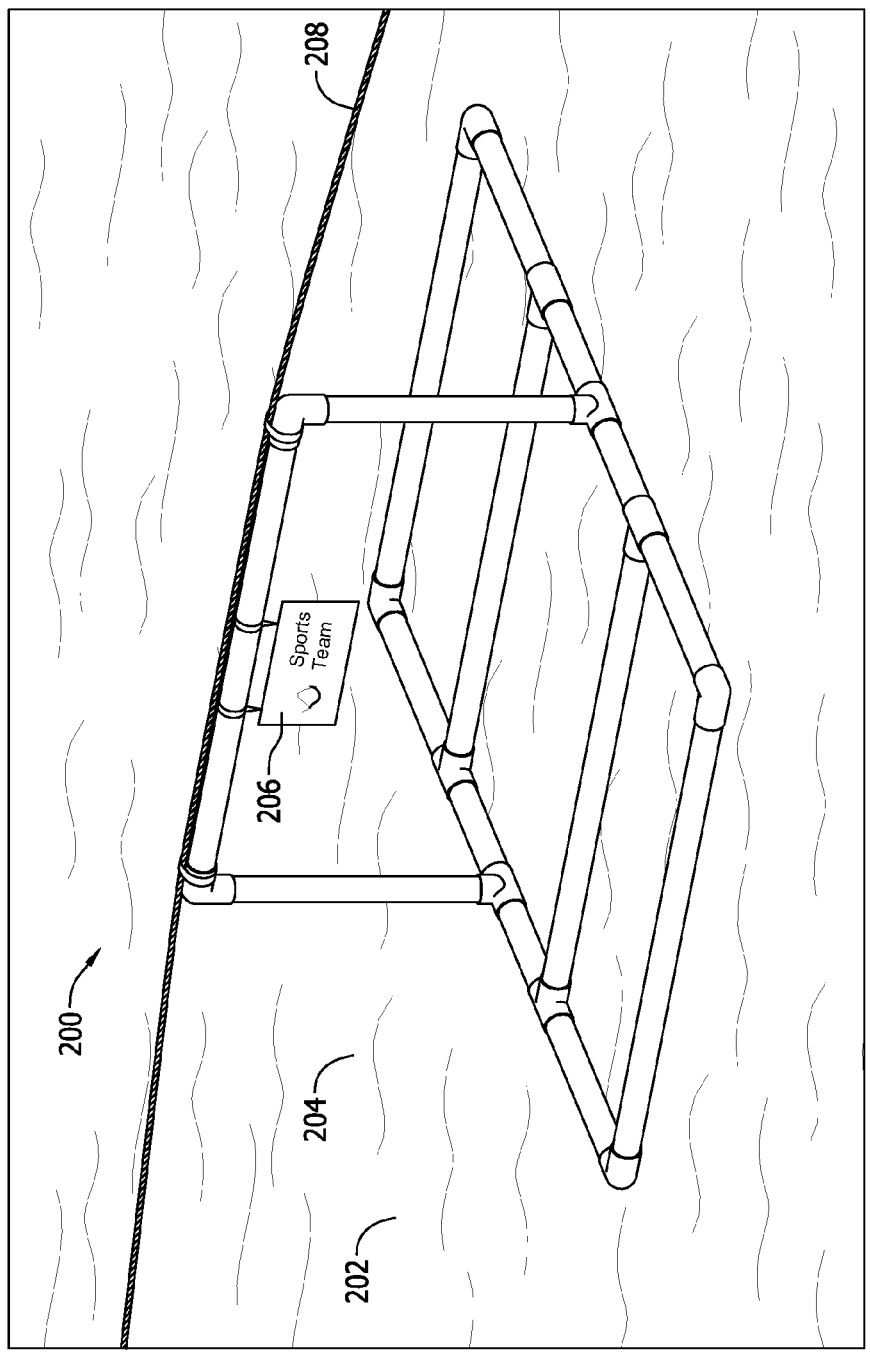
FIG. 6 is a perspective view of another embodiment of a cable support system.

FIG. 6 shows another embodiment of a cable support system referenced in its entirety by the reference number 200. The cable support system 200 is floating on a surface 202 of water 204. The cable support system 200 is similar to the cable support system 100 except the cable support system 200 further includes an ornament 206 positioned on the cable support system 200. The illustrated ornament 206 is flexibly suspended from the support member 140. In the illustrated embodiment, the ornament 206 is a designer license plate containing the insignia and nickname of an athletic team. In alternative embodiments, the ornament 206 may be any suitable decoration that is positioned on any portion of the cable support system 200.

In operation, the cable support system 200 is positioned on the surface 202 of the water 204 such that the base 102 extends across the surface 202 of the water and the support 104 extends substantially perpendicularly to the water. Suitably, the base 102 provides sufficient buoyancy for the cable support system 200 to float substantially above the surface 202 of the water 204. A cable 208 extends over the water 204 between a floating structure (not shown) and a landmass (not shown). Suitably, the cable 208 connects the floating structure to the landmass to maintain the floating structure within a desired range in relation to the landmass. Some floating structures include a plurality of the cables 208 to facilitate maintaining a desired position relative to the landmass and each of the cables 208 may be supported by one or more of the cable support systems 200. It is understood the cable 208 may extend between any floating structures, landmasses, and/or other objects without departing from some aspects of this disclosure.

While only one cable support system 200 is shown, the cable 208 may be supported by a plurality of cable support systems 200. The number of cable support systems 200 used to support the cable 208 will be determined at least in part by the distance the cable 208 spans, the size and weight of the cable 208, the turbulence of the water 204, and the size of the cable support system 200. The cable support systems 200 may be spaced any distances along the cable 208 that enable the cable support systems to support the cable 208. It is understood one or more of the cable support systems 200 may be used to support any number of the cables 208. For example, a single cable support system 200 may support a plurality of the cables 208. Alternatively, the cable support systems 200 may be used as decorations and not necessarily support the cables 208. Further, the cable support systems 200 may be positioned entirely or partially on any fluid surfaces and/or the cable support systems 200 may be positioned entirely or partially on solid ground or structures. For example, the cable support system may be positioned on a structure to support a cable above a hazardous material.

Figure 7:
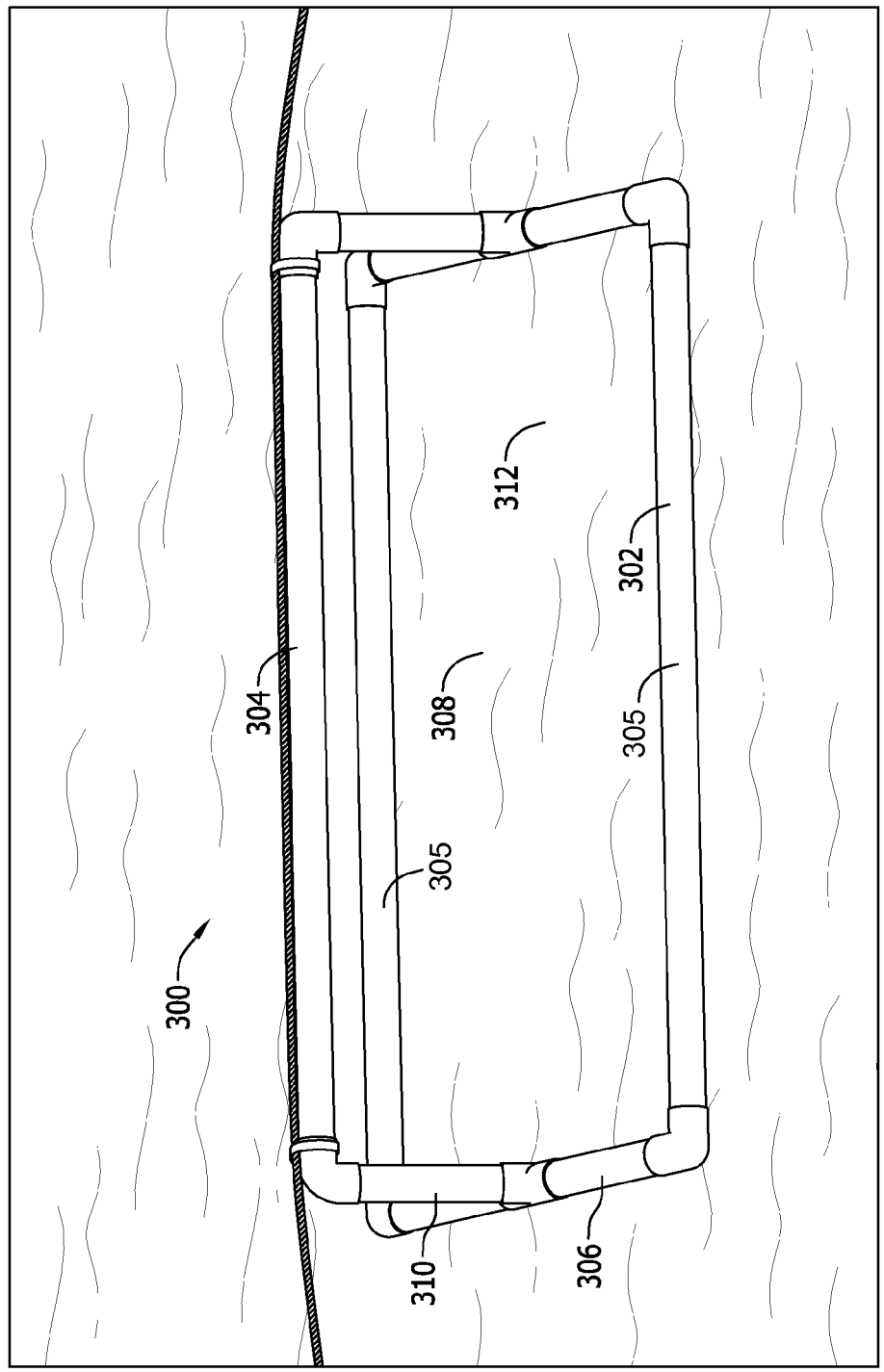
FIG. 7 is a perspective view of yet another embodiment of a cable support system.

In reference now to FIG. 7, another embodiment of a cable support system is shown and referenced in its entirety by the reference number 300. The cable support system 300 includes a base 302 and a support 304 similar to the base 102 and support 104 of the cable support system 100. The cable support system 300 differs from the cable support system 100 in the configuration of the base 302. In particular, the base 302 has only two cross members 305. In addition, the support 304 extends longitudinally in relation to the base 302 instead of transversely. The base 302 includes a base frame 306 defining a base opening 308. The support 304 has a support frame 310 forming an inverted u-shape such that the frame defines a support opening 312. The base opening 308 and the support opening 312 facilitate fluids passing through the cable support system 300.

The cable support systems described herein float on the surface of water and support a cable a distance above the water. Embodiments of the cable support systems are balanced such that the cable support systems remain upright while floating on water even during inclement weather conditions including large waves and high-speed winds. In some embodiments, the cable support systems are lightweight, inexpensive, and easy to assemble. The cable support systems decrease the cost and time spent maintaining and replacing cables that are subject to corrosive conditions due to extending across water. In particular, the cable support systems reduce the corrosive effects on the cable and, thereby, reduce the risk of failure of the cable. Accordingly, the cable support systems extend the useful life of the cables. In addition, some embodiments of the cable support systems may be aesthetically pleasing and allow a user to express personality. In some embodiments, the cable support systems are made of materials that are substantially resistant to corrosion and deterioration over time. A user can readily install the cable support systems without extensive technical knowledge and with minimal risks.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense. Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cable support system for supporting a cable over water, said cable support system comprising:
    an open frame, said open frame defining a plurality of openings for fluid to pass through wherein said plurality of openings cover a majority of the cable support system, said open frame comprising:
        a base constructed to float on the surface of the water, the base including two opposing ends and a first side and a second side extending between the opposing ends, the base defining a width of the cable support system between the first side and the second side, the base defining a length of the cable support system between the opposing ends, and
        a cable support connected to and disposed at least in part above the base, the cable support comprising at least two support legs and a support member extending between the support legs at a height above the base, the support member extending across the width of the cable support system, wherein the height is in a range of about 12 inches to about 36 inches and a ratio of the length to the height is in a range of 1.5 to 5, and
    a coupling mechanism for coupling the cable to the support member such that a portion of the cable extends longitudinally along the support member and is held by the cable support above the base, wherein the coupling mechanism couples the cable to the support member such that the cable spans the width of the cable support system and extends beyond the first side and the second side.
2. The cable support system of claim 1, wherein the support legs extend in a direction substantially perpendicular to the surface of the water.
3. The cable support system of claim 2, wherein the base comprises a front portion, a back portion, and a middle portion intermediate the front and back portions, the support extending from the middle portion of the base.
4. The cable support system of claim 1, wherein the coupling mechanism comprises at least one clamp.
5. The cable support system of claim 1, wherein the base comprises a plurality of pipes.
6. The cable support system of claim 5, wherein the support comprises at least one pipe.
7. The cable support system of claim 1 wherein the base comprises two side members and a plurality of cross members extending between the side members.
8. The cable support system of claim 1, wherein the support comprises an open frame defining at least one opening for the water to pass through.
9. The cable support system of claim 8, wherein the open frame comprises a plurality of pipes connected together.
10. The cable support system of claim 1 further comprising an ornament connected to the support.
11. The cable support system of claim 1, wherein at least one of the base and the support is a color other than white.
12. The cable support system of claim 1, wherein the support member and the support legs form a U-shape and define a support opening.
13. The cable support system of claim 7, wherein the cross members extend linearly in a direction parallel to the support member, the base being open between the cross members.
14. The cable support system of claim 13, wherein the cable support has a distal end and a proximal end, wherein the proximal end is connected to the side members of the base and the support member is located at the distal end.
15. A kit for assembling a cable support system, said kit comprising:
    a front base portion,
    a rear base portion, the front base portion configured to couple to the rear base portion to form a base that floats on the water, the base including a first side and a second side, the base defining a width of the cable support system between the first side and the second side, and
    a support for supporting a cable, the support configured to couple to the base intermediate the front base portion and the rear base portion such that the support extends at least in part above the base and across the width of the cable support system, the support being centered relative to a longitudinal direction of the base when the support is coupled to the base, the front base portion and the rear base portion extending equal distances in the longitudinal direction from the support, the support comprising at least two support legs and a support member configured to couple to ends of the support legs such that the support member extends between the at least two support legs at a height in a range of about 12 inches to about 36 inches, wherein the base and the support form an open frame defining a plurality of openings for fluid to pass through, wherein the openings cover a majority of the cable support system; and
    a coupling mechanism for coupling the cable to the support such that a portion of the cable extends longitudinally along the support member, wherein the coupling mechanism couples the cable to the support member such that the cable spans the width of the cable support system and extends beyond the first side and the second side.
16. The kit of claim 15 further comprising at least one connector for coupling the support to at least one of the front base portion and the rear base portion.

17. The kit of claim 16, wherein the at least one connector is a t-shaped connector having two opposed ends and a perpendicular end, the front base portion and the rear base portion configured to connect to the opposed ends and the support configured to connect to the perpendicular end.

18. A cable support system for supporting a cable, said cable support system comprising:
- an open frame, said open frame defining a plurality of openings for fluid to pass through, wherein said openings cover a majority of the cable support system, said open frame comprising:
  - a base portion comprising two opposing ends and two sides extending between the opposing ends, said base portion defining a length of the cable support system between the opposing ends, said base portion defining a width of the cable support system between the sides;
  - a support portion carried by the base such that at least a portion of the support portion is disposed at a height above the base, the support portion extending across the width of the cable support system, wherein the height is in a range of about 12 inches to about 36 inches and a ratio of the length to the height is in a range of 1.5 to 5; and
- a coupling mechanism coupling the cable to the support portion such that a portion of the cable extends longitudinally along the support portion, wherein the coupling mechanism couples the cable to the support member such that the cable spans the width of the cable support system and extends beyond the first side and the second side.

19. The cable support system of claim 18, wherein the ratio of the length to the height is in a range of about 2 to about 4.

20. The cable support system of claim 18, wherein the coupling mechanism couples the cable to the support adjacent a proximal end of the support.

* * * * *